No. 738,449. PATENTED SEPT. 8, 1903.
A. B. HOUGHTON.
MANUFACTURE OF LANTERN GLOBES.
APPLICATION FILED DEC. 17, 1902.
NO MODEL. 2 SHEETS—SHEET 1.
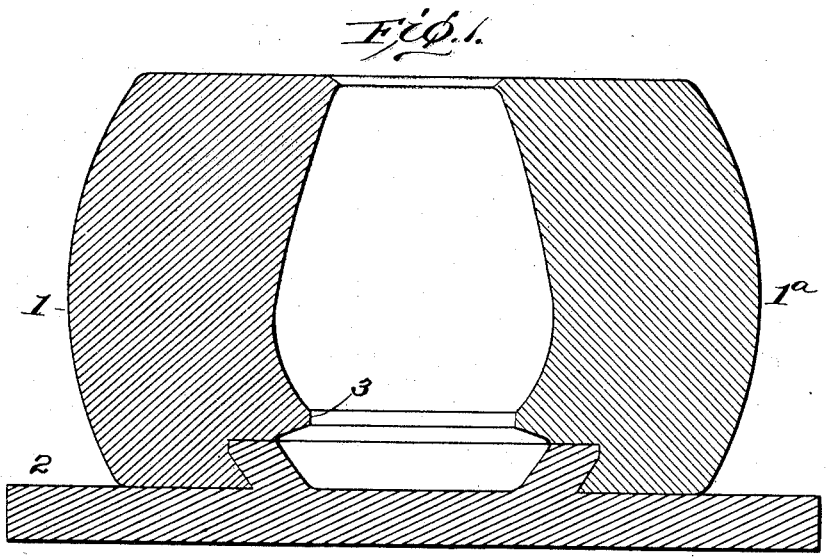
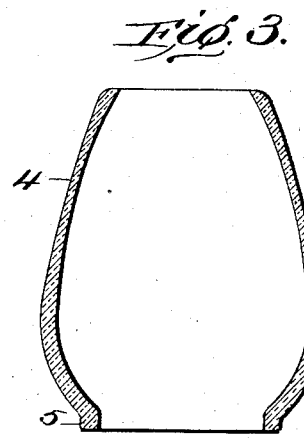

No. 738,449. PATENTED SEPT. 8, 1903.
A. B. HOUGHTON.
MANUFACTURE OF LANTERN GLOBES.
APPLICATION FILED DEC. 17, 1902.
NO MODEL.
2 SHEETS—SHEET 2.
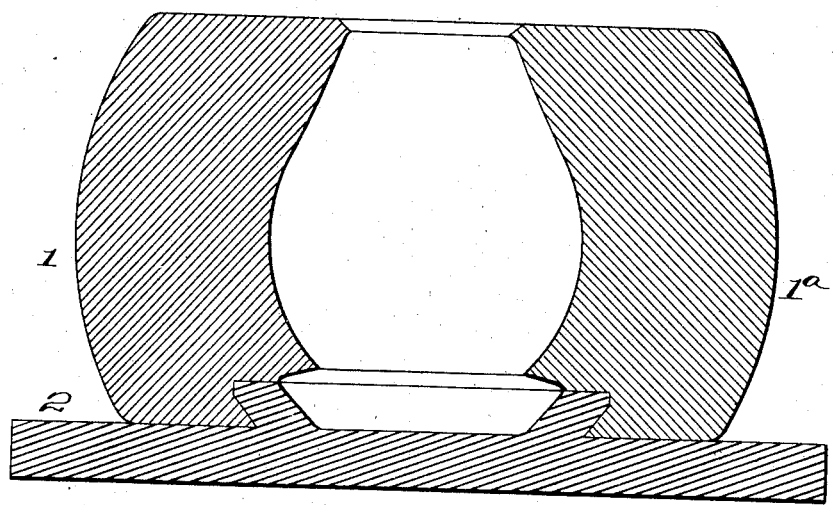
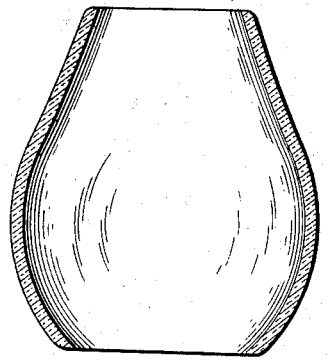   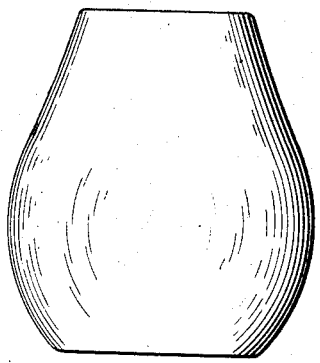

No. 738,449. Patented September 8, 1903.

UNITED STATES PATENT OFFICE.

ALANSON B. HOUGHTON, OF CORNING, NEW YORK, ASSIGNOR TO CORNING GLASS WORKS, OF CORNING, NEW YORK, A CORPORATION OF NEW YORK.

MANUFACTURE OF LANTERN-GLOBES.

SPECIFICATION forming part of Letters Patent No. 738,449, dated September 8, 1903.

Application filed December 17, 1902. Serial No. 135,528. (No model.)

*To all whom it may concern:*

Be it known that I, ALANSON B. HOUGHTON, a citizen of the United States, residing at Corning, in the county of Steuben and State of New York, have invented a new and useful Improvement in the Manufacture of Lantern-Globes, of which the following is a full, clear, and exact description, reference being had to the accompanying drawings and to the numerals of reference marked thereon.

My present invention was originally claimed as a part of application, Serial No. 68,659, filed June 17, 1901, which application went to patent under No. 717,501, dated December 30, 1902, there having been claimed in said original application both the method covered by said patent and the product forming the subject of the present invention.

Heretofore, so far as I am advised, a lantern-globe has never been made having a shape or contour conforming to the natural flow of the glass in the curved line of natural expansion under gravity and pressure, the globes prior to my invention having been formed in a mold of a shape contrary to that naturally assumed by the glass during its flow and expansion under the influences of such forces. In other words, the molds heretofore used have been artificial in their shape, producing a globe distorted from the natural conformation assumed by glass blown when at the end of a blowpipe in the open air. The shape naturally taken by the hollow blank of glass when so blown is substantially that of a pear, and heretofore the blank or mass of glass in that shape provided by nature has been placed in a mold of different shape and expanded, so that when the globe has been finished such natural shape has been under the influences of gravity and pressure artificially distorted to conform to that of the mold. It has been found, furthermore, in globes heretofore made, especially when they have been formed with an annular bottom flange, which has been erroneously considered necessary in holding the globe in place, that there has been a lack of uniformity in the thickness of the walls of the globe and that the globe has not been of equal density, or, in other words, it has been lacking in homogeneity, these defects being caused in part by the distorting effect of the mold employed and also by the excess of pressure required to carry the glass past the sharp angle produced at the union between the bottom flange or ring and the lower curved portion of the globe, the angle obstructing the natural flow and expansion of the glass and causing a choking of the glass at such point of union. The flange or ring has therefore proved a source of weakness, which is explainable in various ways, one of which is that the ring is subjected to strain on the outside because its surface is compressed and on the inside because its surface is stretched; but whatever the explanation, such a ring at the bottom or lower edge of the hollow body of glass substantially globular or oviform or of the somewhat different shape given to my invention, must necessarily, because of the existence of certain conditions, tend to greatly weaken and shorten the life of the globe. For example, the pressure required to blow the glass forming such flange or ring into the part of the mold necessary to form it is greatly in excess of that required to blow the globe without it, especially when, as in my invention, the glass follows its natural course in the mold, to effect which action hardly any pressure (comparatively speaking) is needed, and it will be readily seen that a globe having natural lines of curvature without an angular break in such curvature must have walls of equal thickness throughout and of the same density (homogeneity) of substance, there being no disturbance of the molecular conditions, such as must exist where the walls of the globe are not shaped in natural lines of curvature. Furthermore, it will be seen that in blowing globes having an obstructing angle diverting the natural flow and expansion of the glass the pressure necessarily cannot be uniform, for in carrying the glass past such angle a sudden increased pressure is needed not required in forming the remaining portions of the body of the globe.

In constructing my improved lantern-globe I avail myself of conditions which have been discovered by me after much experimentation and test, the result of which has been the production of a globe capable of withstanding great diversity of temperatures, ranging from many degrees below zero to a high degree of natural atmospheric heat and to the heat due to the flame, as well as the sudden and almost endless variations of temperature, the destructive action of the elements, as of wind, rain, snow, &c., and the rough usage to which such a lantern-globe is subjected, the product herein described having throughout its entire body the greatest attainable degree of strength, which is uniform in all parts thereof, and is deprived of structural weakness at all points.

In the accompanying drawings, Figure 1 shows in section a two-part iron mold adapted to produce a lantern-globe of the shape or conformation heretofore generally in use. Fig. 2 is a similar view, illustrating a mold capable of being employed in conducting my invention. Fig. 3 is a sectional view of the ordinary globe representing a defect in its manufacture. Fig. 4 is a similar section, and Fig. 5 an exterior view, of my improved globe.

Similar numerals of reference indicate similar parts in the respective figures.

1 1$^a$ indicate sections of a two-part mold, and 2 a base-plate. By reference to Fig. 1 it will be seen that the mold is provided with an annular stepped shoulder 3, which enables a ring or flange 5, Fig. 3, to be formed at the juncture of the curve or bulge of the globe, whereas in Fig. 2, which represents a mold adapted to carry out my invention, the step or shoulder 3 is absent. Fig. 3, which is a longitudinal section of the ordinary and heretofore-approved type of lantern-globe, shows the walls at 4 thinner than at the upper and lower parts, this decrease in thickness being due to the irregularity of pressure required in blowing or molding, because, in part, of the choking of the glass at the angle between the curved body and the flange or ring 5. Fig. 3 may show the defects of the globe at 4 somewhat exaggerated; but this is done to better illustrate the feature referred to. Fig. 4 shows a similar section of my improved globe, the lower flange or ring 5 being omitted. In Fig. 2 is seen a section of a mold used in producing my improved lantern-globe, and it will be observed that the shape or contour of its walls differs materially from that of the walls of the mold shown in Fig. 1. In Fig. 2 the lines of curvature of the walls of the mold are of the same shape as the lines of curvature naturally followed by the glass when flowing and expanding under the influences of gravity and air-pressure, so that the glass received by the mold is not shaped thereby, but, more properly speaking, is limited in size and in degree of expansion by the walls of the mold. Therefore the term "mold," here conventionally retained, does not strictly apply to the expedient used by me, which is rather a size-controller than a shape-producer. The results, as above stated and in consequence of the omission of the shoulder or projection 3, as seen in Fig. 1, are that the flow or expansion of the glass is natural and unimpeded, the walls of the globe are kept uniform in thickness, and therefore of equal strength at all points, and that the same solidity and density of glass, due to lack of disturbance of molecular conditions, is maintained at all parts. The "blowover," as will be understood, extends above the mold, while the thin surplus of glass is formed in its base, both of which extraneous bodies of glass are removed, as is well understood in this art.

Having thus described my invention, I claim—

1. As a new article of manufacture, a lantern-globe having walls of equal thickness, the incurved bottom portions of said walls being of uninterrupted curvature, the entire contour of said globe following the natural lines produced in the blank in blowing, substantially as specified.

2. As a new article of manufacture, a lantern-globe having walls of equal thickness and uniform density, the incurved bottom portions of said walls being of uninterrupted curvature, the entire contour of said globe following lines of curvature produced in the blank in blowing, substantially as specified.

3. As a new article of manufacture, a lantern-globe having a general shape following the natural lines of curvature produced in the blank in blowing, and walls of equal thickness, substantially as specified.

4. As a new article of manufacture, a lantern-globe having a general shape following the natural lines of curvature produced in the blank in blowing, and walls of equal thickness and uniform density, substantially as specified.

In testimony whereof I hereunto set my hand and seal.

ALANSON B. HOUGHTON. [L. S.]

Witnesses:
W. J. TULLY,
MACK S. SMITH.